No. 674,717. Patented May 21, 1901.
C. WAGNER.
TESTING BOTTLE.
(Application filed Mar. 26, 1901.)

(No Model.)

WITNESSES:
William P. Gaebel.
Rev. G. Hostetz

INVENTOR
Constantine Wagner
BY
Munn
ATTORNEYS

UNITED STATES PATENT OFFICE.

CONSTANTINE WAGNER, OF NEW YORK, N. Y.

TESTING-BOTTLE.

SPECIFICATION forming part of Letters Patent No. 674,717, dated May 21, 1901.

Application filed March 26, 1901. Serial No. 52,949. (No model.)

*To all whom it may concern:*

Be it known that I, CONSTANTINE WAGNER, a citizen of the United States, and a resident of the city of New York, borough of Manhattan, in the county and State of New York, have invented a new and Improved Testing-Bottle, of which the following is a full, clear, and exact description.

The invention relates to bottles for testing milk and other liquids; and its object is to provide a new and improved testing-bottle arranged to permit the operator to conveniently make a test and readily and accurately read off the amount of fat without the use of dividers or like measuring-tools.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
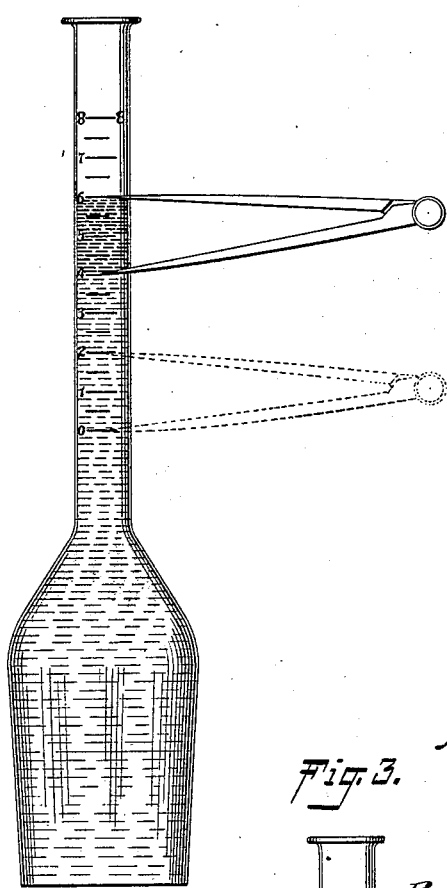
Figure 2:
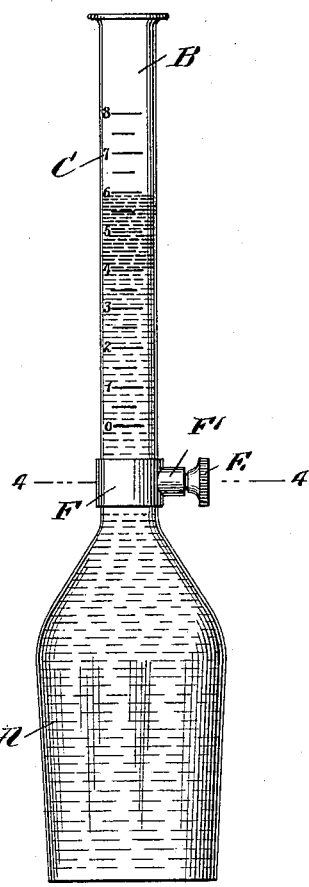
Figure 3:
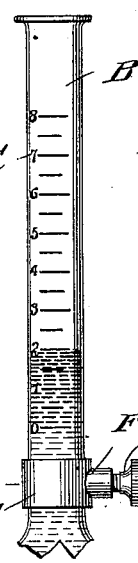
Figure 4:
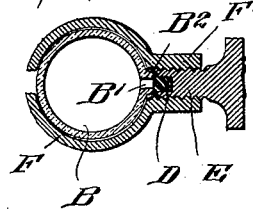
Figure 5:
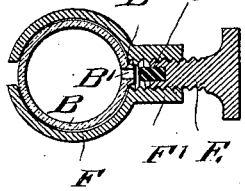

Figure 1 is a side elevation of the ordinary testing-bottle now in use. Fig. 2 is a like view of the improvement. Fig. 3 is a similar view of part of the same with the column of fat in position for reading off the amount of fat. Fig. 4 is a sectional plan view of the same on the line 4 4 of Fig. 2, and Fig. 5 is a like view of the same on the line 5 5 in Fig. 3.

In the use of testing-bottles as heretofore constructed it has been difficult to accurately read on the graduation the amount of fat separated from the milk, as the fat usually rises in the graduated tube of the bottle beyond zero, and it is then necessary for the operator to either calculate the height of the column of fat or to use a compass or other measuring-tool (see Fig. 1) to measure the height of the column of fat and to then apply the compass on the graduation with the leg on the zero-mark (see dotted lines in Fig. 1) to read off the proper amount of fat.

With my improvement presently to be described in detail the use of a compass or like tool is entirely dispensed with, and the operator is enabled to bring the column of fat down in the graduated tube until the bottom of the column is at zero on the graduation, and the height of the column of fat can then be easily read off without calculation or the use of a measuring-tool.

The improved bottle (shown in Figs. 2 to 5, inclusive) consists of the body A, terminating in a tube B, having the usual graduation C, and at or near the lower end of the graduated tube B and preferably at one side thereof is formed a discharge or outlet opening B', normally closed by a valve D, made of a piece of rubber held to turn loosely in a screw E, screwing in a boss F' of a segmental or split metal ring F, melted on the glass tube B to hold the ring F against movement thereon. The opening B' is blown from the inside of the tube in an outward direction after the ring F is in position, and in so producing the opening B' a boss B² is formed, which surrounds the opening and extends outward into the boss F' to assist in holding the ring F against movement on the tube B.

The ring F is preferably made in split form to prevent breaking of the tube by the unequal expansion and contraction of the glass and metal of which the tube B and the ring F are made. The opening B' can be readily closed or opened by the operator turning the head of the screw E to the right or to the left to carry the screw E outward or inward.

The valve D is normally seated on the boss B² to close the opening B' to permit of using the bottle in the ordinary manner for making tests—that is, the body A of the bottle is partly filled with milk, then an acid is added, after which the bottle is subjected to centrifugal or other action to cause the acid to mix with the milk and separate the fat therefrom. When this has been done, hot water is poured into the bottle to cause the separated fat to rise in the graduated tube B, as indicated in Fig. 2, and then the operator screws the screw E outward to cause the valve D to uncover the opening B' and to allow the liquid in the lower portion of the graduated tube B to flow out. As the liquid flows out of the opening B' the column of the liquid, with the column of the fat, gradually descends until the bottom of the column of fat reaches the zero-mark on the graduation C, (see Fig. 3,) and then the operator screws the screw E inward, so that the valve D again closes the opening B', and thereby prevents further outflow of the liquid from the bottle. The column of fat now stands in the graduated tube, the bottom of the column being at the zero-mark and the top at a point on the graduation which can be read off to give the total amount of fat in the graduated tube.

As shown in the drawings, the zero-mark on the graduation C is somewhat above the top of the ring F and its valve D, so that the operator can readily see the said zero-mark and gage the time to close the valve D when the bottom of the column of fat reaches said zero-mark.

It is evident that by having the valve D mounted loosely in the screw E said valve will last a long time, as it is not liable to be cut by the boss $B^2$ when the screw E is screwed inward, as the valve will be held stationary after moving into engagement with the boss on further screwing up the screw E.

It will be seen that the device is very simple and durable in construction, can be cheaply manufactured, is readily manipulated by the operator, and is arranged to permit the operator to readily and accurately read off the amount of fat separated from the milk. Sufficient space is usually left between that part of the tube B and the ring F at the boss F' to permit the milk to readily flow out of the opening B' and down the outside of the tube and body A; but it is specially understood that the operator has full control of the outflow of the milk, and the descent of the column of fat in the graduated tube will bring the bottom of the column in register with the zero-mark on the graduation, as above explained.

Having thus described my invention, I claim as new and desire to secure by Letters Patent—

1. A testing-bottle, having a discharge-opening below the zero-mark on the tube of the bottle, a ring held against movement on the tube of the bottle, a screw screwing in the said ring, and a valve carried by the said screw for closing or opening the said discharge-opening, as set forth.

2. A testing-bottle, having an apertured boss below the zero-mark on the tube of the bottle, a ring on the said tube and having a threaded boss into which projects the said apertured tube-boss, a screw screwing into the said apertured ring-boss, and a valve carried by the said screw and adapted to be seated on the said tube-boss for closing the opening therein, as set forth.

3. A testing-bottle, having an apertured boss below the zero-mark on the tube of the bottle, a ring on the said tube and having a threaded boss into which projects the said apertured tube-boss, a screw screwing into the said apertured ring-boss, and a valve carried by the said screw and adapted to be seated on the said tube-boss for closing the opening therein, the said valve consisting of a piece of rubber held loosely in the end of the screw, as set forth.

In testimony whereof I have signed my name to this specification in the presence of two subscribing witnesses.

CONSTANTINE WAGNER.

Witnesses:
THEO. G. HOSTER,
EVERARD BOLTON MARSHALL.